United States Patent
Duran et al.

[19]

[11] Patent Number: 6,115,608
[45] Date of Patent: Sep. 5, 2000

[54] INTERSYSTEM HANDOVER METHOD AND APPARATUS

[75] Inventors: Jose M. Duran, Paris, France; Xiaomei Wang, Plano, Tex.

[73] Assignee: Northern Telecom Limited, Montreal, Canada

[21] Appl. No.: 08/926,610

[22] Filed: Sep. 10, 1997

[51] Int. Cl.[7] .............................. H04Q 7/20; H04Q 7/22
[52] U.S. Cl. ..................... 455/436; 455/437; 455/438
[58] Field of Search ..................... 455/436, 552, 455/553, 422, 437, 438, 439, 442, 448, 432, 426

[56] References Cited

U.S. PATENT DOCUMENTS

| | | | |
|---|---|---|---|
| 4,811,380 | 3/1989 | Spear | 455/437 |
| 5,345,448 | 9/1994 | Keskitalo | 455/439 |
| 5,509,035 | 4/1996 | Teidemann, Jr. et al. | 455/436 |
| 5,697,055 | 12/1997 | Gilhousen et al. | 455/436 |
| 5,857,153 | 1/1999 | Lupien | 455/422 |
| 5,878,349 | 3/1999 | Dufour et al. | 455/438 |
| 5,901,354 | 5/1999 | Menich et al. | 455/442 |
| 5,940,761 | 8/1999 | Tiedemann, Jr. et al. | 455/437 |

*Primary Examiner*—Dwayne D. Bost
*Assistant Examiner*—Erika A. Gary
*Attorney, Agent, or Firm*—Carr & Storm, L.L.P.

[57] ABSTRACT

A method and apparatus for providing seamless transfer of a active call between cellular communication systems operating in different signal formats and different modes of handoff request initiation. An example being a mobile initiated CDMA/FDMA/TDMA system like IS-661 and a TDMA/FDMA network initiated system like PCS 1900. The system which initiates handoff requests internally is aware of all the IDs of all the BTSs of the other communication system with which it is to interact and the MSs monitors signals of both formats for maintaining a table of received signals from nearby cells, the cell IDs and signal quality, while maintaining an active call and the further ability to transmit a handover request on a command channel while in the active call mode.

16 Claims, 3 Drawing Sheets

INTERSYSTEM HANDOVER METHOD AND APPARATUS

TECHNICAL FIELD

This invention pertains generally to wireless communications systems for servicing mobile subscribers, and in particular to intersystem handoff of mobile phones between two systems having different handoff procedures and formats.

BACKGROUND

As a preface and guide, the following acronyms and terms used in this disclosure represent the associated definitive terminology below:

| | |
|---|---|
| AMPS | Advanced Mobile Phone System |
| BER | Bit Error Rate |
| BSC | Base Station Controller |
| BSS | Base Station Subsystem (a combination of a BSC and one or more associated BTSs) |
| BTS | Base station Transceiver Subsystem |
| BTS-A | Base station Transceiver Subsystem of cellular communication signal format A (PCS1900) |
| BTS-B | Base station Transceiver Subsystem of cellular communication signal format B (IS-661) |
| CDMA | Code Division Multiple Access (a communication channel scheme where a each channel has its own code and a MS only accepts information including a preassigned code) |
| dual mode MS | MS (mobile station) having circuitry such that it is able to operate in two different mode signal formats such as PCS1900 and IS-661 |
| DS1 | Signal transmission link having a information capacity of 24 message channels and has a bandwidth of 1.544 Mb/s |
| FDMA | Frequency Division Multiple Access (a communication channel scheme where a each channel has its own frequency and a MS only accepts information on a preassigned frequency) |
| foreign system | A different system. The difference may be in format, territory, ownership etc. |
| GSM | Global System for Mobile Communications |
| handoff | Act of transferring communication with a mobile station from one base station to another base station where both base stations use the same communication signal format even though they may be connected to different MSCs or even a foreign MSC involving an interexchange or intersystem handoff |
| handover | Act of transferring communication with a mobile station from one base station to another (foreign base station) where the two base stations use different communication signal formats even though they may be connected to the same master switch |
| HLR | Home Location Register |
| ID | IDentification |
| IS-661 | PCS (personalized cellular communication system) standard that uses a combination of TDMA, FDMA and CDMA for differentiating and optimizing the communication channels |
| mobile initiated | Cellular system where handoff of an active call of that system is initiated by a MS |
| network initiated | Cellular system where handoff of an active call of that system is initiated by a portion of the network other than the mobile station |
| MS | Mobile Station (includes cordless and cellular telephones, radios, fax devices etc.) |
| MSC | Mobile services Switching Center |
| OAM | Operations, Administration and Management |
| PCS | Personal Communication Service (a personalized cellular communication system) |
| PCS-1900 | Digital cellular system for the US market, similar in format to a GSM system, using TDMA and FDMA in the communication channel process and operating in the 1850-1990 MHz bands |
| PSTN | Public Switching Telephone Network |
| TDMA | Time Division Multiple Access (a communication channel scheme where a each channel has its own time slot of occurrence with respect to a reference and a MS only accepts information during a preassigned time slot) |
| VLR | Visitor Location Register |

The most prevalent form of a mobile wireless communication system is a cellular network. In such a network, a territory serviced by it is divided into a plurality of geographically substantially distinct, but normally overlapping cells. Within each cell is a BTS (Base station Transceiver Subsystem) at which there is an antenna or antenna array connected to a bank of radio transmitters and receivers (hereinafter "radios") for communicating with MSs (Mobile Stations) within the territory. A plurality of BTSs in a GSM (Global System for Mobile Communications) type system are controlled, at a first level of control, by a BSC (Base Station Controller). Such a BSC and its associated BTSs may be termed a BSS (Base Station Subsystem). A plurality of these BSSs are connected to a switch sometimes referred to as a MSC (Mobile services Switching Center). This connection is often a communication link having the capacity of at least a DS1. Within the MSC and the BSC there are a plurality of subsystems for routing calls to appropriate BTSs, for issuing instructions to the connected BTSs, and administrative duties like keeping track of home registered MSs as well as of visiting MSs.

The MSC connects calls between two MSs within the network, between a MS and a PSTN (Public Switching Telephone Network) and periodically between a MS of that system and a MS of a foreign mobile system. When two MSs need to communicate with each other and are within cells controlled by a single BSC, the BSC is typically able to make the connection without communicating that action to the MSC.

As is known by those skilled in the art, there are many different signal formats used for communicating with an MS. The format difference may be a variation in the way in which information channel are changed in frequency, in time of occurrence and in the way the data is modulated or otherwise coded into a given information channel. Some example formats are FDMA (Frequency Division Multiple Access), TDMA (Time Division Multiple Access), CDMA (Code Division Multiple Access), and combinations thereof.

The analog cellular systems in the United States started operation in the 824–849 MHz frequency bands. Present day cellular systems in the U.S., many of which are digital, still use the original frequency bands and also operate in the 1850–1990 MHz frequency bands. However each MSC has, regardless of the communication format used with the MS, similar functions in that it has to be able to establish communication with MSs in all the cells for which that MSC is responsible so that appropriate communication channels can be assigned and later reused. The MSC further needs to recognize and track foreign system MSs that enter a cell for which that MSC is responsible.

As mentioned above, the term "handoff" refers to the transferring of communications between an MS and the system from the BTS of one cell to another BTS. An interexchange handoff may occur to the BTS of a "foreign" system cell and, in such a situation, communication must take place between foreign and local MSCs. When it is obvious to which adjacent cell a MS is being transferred, it is referred to as a "two way handoff." However, at times, a MS approaches the influence of two adjacent cells simultaneously, and, thus, the MSC must prepare both of the affected BTSs to receive the incoming MS because the direction that the MS takes upon leaving a given cell is not predictable. This handoff is designated in the prior art as a "three way handoff." Once the MS is communicating with one of the two possible receiving cells, the communication channels reserved in the original and alternate receiving cells are released for reuse by other MSs.

The original MSs in analog systems were busy 100% of the time with a call, when in an "active call" mode, and all decisions as to when a call should be handed off to another cell and to which cell it should be handed off, were made by system controllers, such as a MSC, a BSC or one or more BTSs acting in concert. Some present day digital MSs are busy communicating with the local BTS a fraction of the duration of an active call. As an example, the TDMA used by some GSM type systems utilizes eight time slots. Thus the MS is communicating with a local BTS only during one time slot for receiving voice information and another time slot for transmitting voice information. The MS thus has a considerable amount of time (the other six time slots) to transmit, receive and/or process other information or perform other functions. The MSs, in prior art GSM type systems, have used this time to monitor the reception of signals from other nearby BTSs and measure signal quality in the form of signal strength and in some systems BER (Bit Error Rate). Typically the MS has recorded and stored not only this information, but, in addition, the ID (IDentification) of the BTS being measured. This information is then periodically transferred to the appropriate system controllers so that the system can determine when a handoff should occur. This handoff determination is referred to as network initiated since a centralized controller is the arbiter of the handoff process.

Another digital PCS system known as IS-661 has 16 or 32 time slots. In the 16 time slot version, the MS uses 1 of the 16 time slots for sending user generated signals to the BTS and 1 additional time slot for receiving signals from the BTS. The MS thus is in communication with a BTS handling the active call only a small percentage of the time. Since the system design (combining TDMA, CDMA and FDMA to be used simultaneously) allowed many more communication channels to be handled simultaneously by a single BTS, the system design made the MS intelligent and let it request that a handoff be permitted to occur. The handoff request would be determined by the quality of other signals received by the MS as compared to the quality of the active call signals. As is known to those skilled in the art, fading of a signal in an analog system is typically very gradual as compared to a digital system. When a MS is capable of monitoring the signal quality of many nearby stations and can keep this information in readily updated storage, it may very well be the best resource for determining when a handoff should occur and to which BTS. This type of handoff determination is referred to as mobile initiated.

A dead spot in a cellular system defines an area, within a given cell, wherein there is no reliable communications between an MS and the BTS defining that given cell. After a cellular system is designed and activated, conditions can change to cause dead spots in a cell which were not there previously. This may be caused by a new building, changes in landscape due to road construction etc. While the communication problems caused by such dead spots can often be overcome by handoffs to other BTSs in the general area or by additional low power and strategically located antennas, there are occasions such system modifications are not economically practical.

Another problem that may occur after a cellular system is completed is that the number of MSs brought into a given area and attempting communications at a given time far exceeds expectations. This problem can sometimes be overcome by subdividing the original cell into many additional new cells with the accompanying cost of additional cell sites, additional BTSs and invariably additional switching capacity.

A further problem may be caused by a building or set of buildings, such as an educational campus, which may wish to have an internal communication link with cordless personal communication units similar to a PCS for communication within the campus via a private branch exchange (PBX) system having low power antenna apparatus that is substantially confined to the campus. Such a private system can be very cost-effective for the campus and ease the problems of cellular system expansion by the local cellular provider. When one of these units needs to communicate with phones outside the confines of the campus, the PBX may connect to the outside world via a communication link to a local cellular provider. If the campus system is a completely self contained, it may connect directly to a public service telephone network. Regardless of the inner workings of such a campus system, it would be convenient to be able to use such a cordless personal communication unit outside the campus and not have to buy and/or carry an additional MS. It would be even more convenient if one could commence a conversation via the campus system and continue the call seamlessly to a local cellular system when the MS leaves the confines of the campus. With such a system, the caller would only be charged for phone call time while beyond the confines of the campus.

Even though the cellular phone units in the campus situation described above can be moved, the associated system is known in the art as a "fixed access unit" when the system has a non-movable antenna attached to the building and it serves one or more phone units. In a campus situation, the system would typically include a BTS to serve multiple phone units. Further, such a system would additionally typically support many phone units on campus which are wired in place rather than being cordless or cellular.

As a separate issue, it may be noted that dual mode MSs have been known in the prior art which may allow an active call to be handed off between a TDMA system and an AMPS (Advance Mobile Phone System) system. Both of these systems are network initiated and in the situations where such dual mode MSs were used, the systems were adjacent each other and one did not overlay or super impose upon the other.

Further problems with prior art systems included the time involved in determining that a handoff was required, determining to which BTS the handoff should go, allocating resources and sending the appropriate information to the MS. With different systems and different signal formats, the coordination problems involved in a handoff between systems were substantial.

SUMMARY OF INVENTION

The present invention solves the problems outlined above through the use of a single MSC, in a preferred embodiment, communicating with and controlling two different format systems wherein each format system has its own BSCs and BTSs.

BRIEF DESCRIPTION OF THE DRAWING

For a more complete understanding of the present invention and the advantages thereof, reference is now made to the following Detailed Description taken in conjunction with the accompanying Drawings in which.

DETAILED DESCRIPTION

Figure 1:
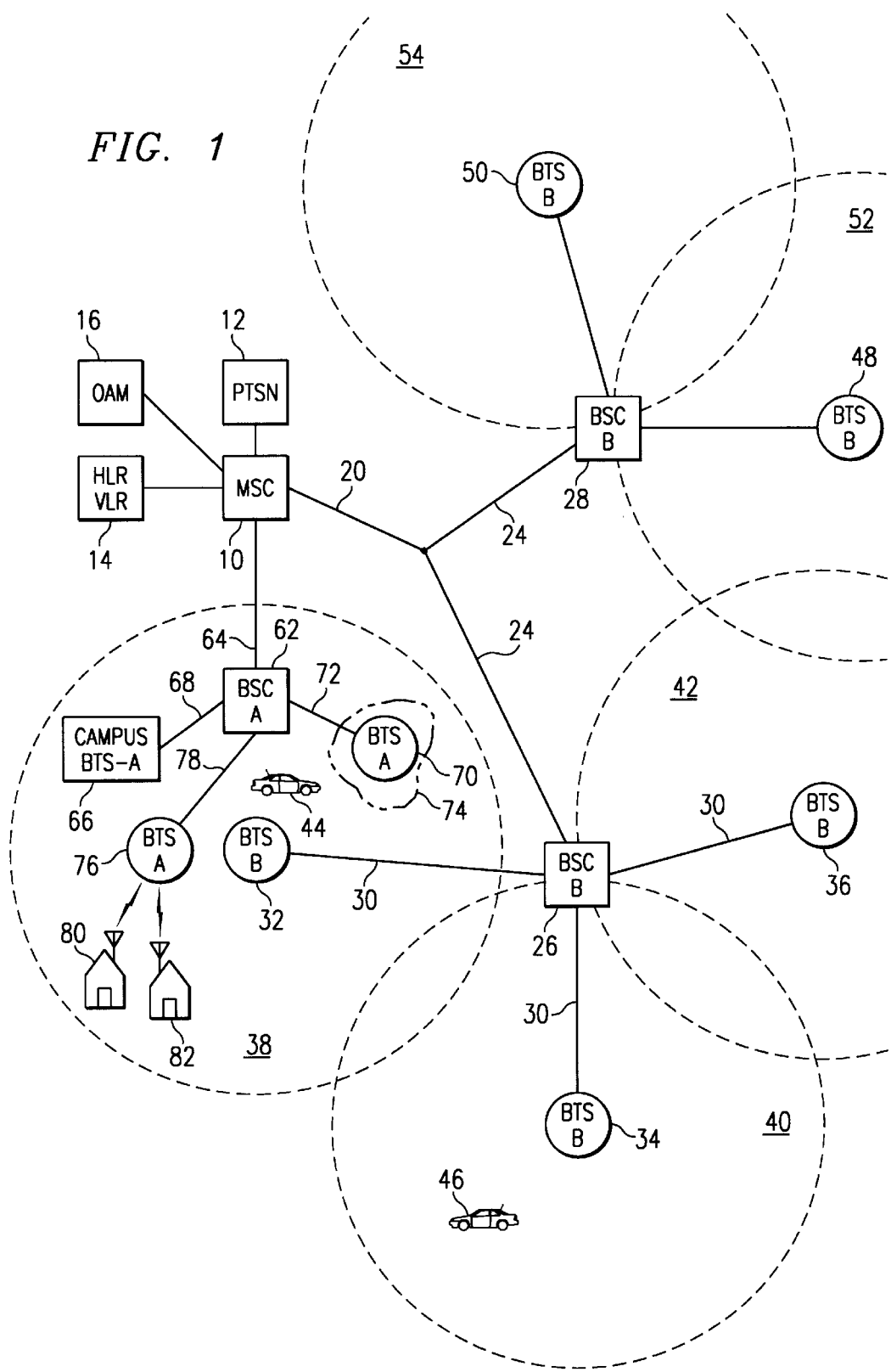
FIG. 1 is a block diagram illustrating an interconnection of components forming a cellular system operating in two different formats one of which overlays the other in specific areas.

In FIG. 1, a MSC (Mobile services Switching Center) block 10 is connected to a PSTN (Public Switching Telephone Network) block 12 by an undesignated communications link. A HLR (Home Location Register) and VLR (Visitor Location Register) block 14 is also connected to MSC block 10 by an undesignated communications link as is an OAM (Operations, Administration and Management) block 16. The MSC block 10 is connected by a communications link 20 to a pair of BSCs (Base Station Controller)s 26 and 28 comprising part of a first signal format system which may be for example a network initiated TDMA/FDMA system like PCS1900. The various components of the PCS1900 system are shown with a trailing identifier B to more readily identify and distinguish same. As will be realized, in a large cellular system, there would be many more than two BSCs. The BSC block 26 is connected by communication link 30 to BTS (Base Transceiver Station) blocks 32, 34 and 36. Although not labeled as such, a BSC such as block 26 and its associated BTSs 32, 34 and 36 constitute a BSS (Base Station Subsystem). A dash line 38 represents an imaginary line within which MSs (mobile station)s operating in the PCS1900 mode can normally communicate satisfactorily with BTS 32. Although a MS may occasionally be able to communicate with BTS 32 well outside dash line 38, the communication would be often unreliable. A dash line 40 defines an imaginary boundary for the extent of reliable communications with MSs in communication with BTS 34. A further dash line 42 defines the reliably useable limits of the area served by BTS 36. Although each of these BTSs would serve many MSs within their defined areas 38, 40 and 42, only two MSs are shown for the purposes of explaining the invention. These are a MS 44 within dash line 38 and a MS 46 within dash line 40. The BSC 28 is shown connected to BTSs 48 and 50. A designator 52 defines a dash line area served by BTS 48 and a designator 54 defines a dash line area reliably served by BTS 50. As will be apparent, MSs that communicate with the BTSs 32, 34, 36, 48 and 50 must have radio circuitry that can receive and transmit information in the PCS1900 TDMA/FDMA signal format.

The MSC 10 also provides communication to one or more BSCs operating in a second signal format such as the mobile initiated system TDMA/CDMA/FDMA format of Omnipoint IS-661. Only a single BSC 62 is shown connected to MSC 10 and this communication link is designated as 64. The letter "A" is shown in the various blocks operating in the IS-661 format for clarity of illustration. A block 66 is shown where block 66 represents a campus environment and includes a BTS for communicating with a campus installed communication system. The campus installed communication system may be a combination of wired and cellular phones. Depending on the size of the campus and the design of the system, there may actually be a plurality of BTSs within campus 66. The system is designed such that a single mode MS designed for only IS-661 format signals would not operate beyond the confines of the campus represented by block 66. The block 66 communicates with BSC 62 via communication link 68. Link 68 may be wireless using microwave frequencies that do not interfere with other radios in the area or may be a solid connection such as a DS1 transmission line. A second BTS 70 is shown connected to BSC 62 via a communication link 72. A solid enclosed line 74 defines a "dead spot" within the service area defined by dash line 38 where signals from BTS 32 cannot be reliably received by a MS designed for communication in the PCS1900 format. Such a "dead spot" can be caused by the construction of a large building complex between BTS 32 and the area defined by area 74. The movement of large amounts of earth in freeway construction may also cause "dead spots" in areas which had reliable signal reception when a BTS of a cellular system first commenced operating. As will be explained in more detail later, if the MS 44 has a dual mode radio, it can operate in the PCS 1900 format at the position shown, can switch to the IS-661 format while in the "dead spot" 74 and return to the PCS 1900 format when it leaves the area defined by 74. A final BTS 76 is connected to BSC 62 via a link 78. Blocks 80 and 82 represent fixed access units as opposed to mobile stations. In some ways they are similar in concept to the campus 66. A fixed access unit, such as 80, may receive IS-661 format communication signals from BTS 76 at a reduced rate as compared to a mobile unit. Such a fixed access unit may be designed to operate wired or cordless phones.

In instances where cordless phones, used with such a fixed access unit described above, had dual mode capability, they could switch to PCS1900 format communication signals when the cordless phones exceeded the communication range of the cordless phone base unit. This is possible because even though the fixed access unit is receiving signals in the IS-661 format to supply communication signals to the cordless phone base unit, it is still located in a PCS1900 cell. Similar comments would apply to the campus situation of block 66.

It should be noted that the combination of a BSC and one or more BTSs connected thereto form a BSS (Base Station Subsystem) applies to both systems.

Figure 2:
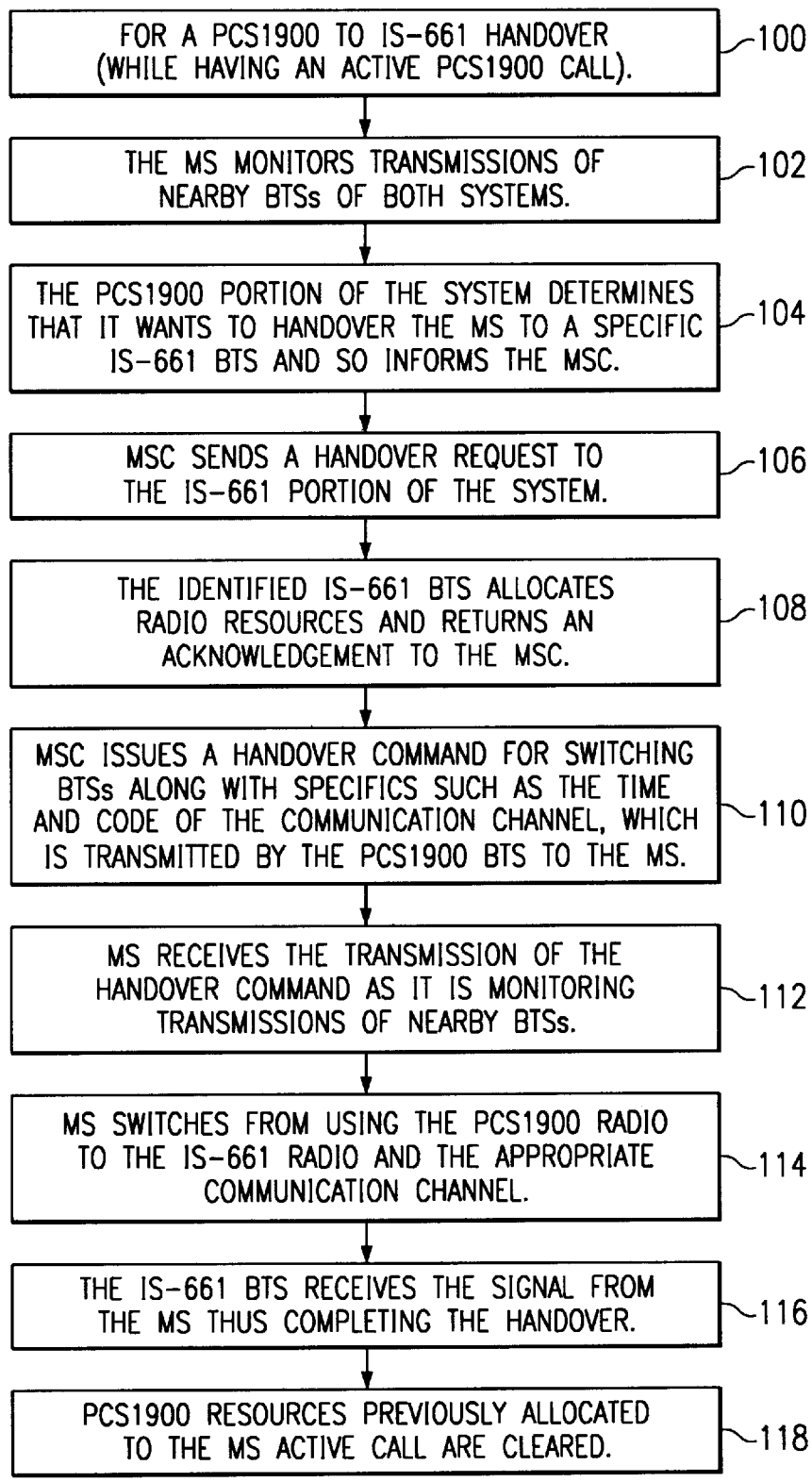
FIG. 2 is a flow diagram of system operation for a PCS1900 to IS-661 handover.

In FIG. 2 a block 100 represents the initial step in a procedure where a MS having an active PCS1900 call needs to be handed over to an IS-661 BTS. As set forth in a block 102, the MS continually monitors the transmissions of nearby BTSs having the strongest signals and supplies information obtained during the monitoring to the BTS handling the active call as to signal quality etc. The supplied information may also include data as to the signal quality of the received active call signal. In block 104, a control unit in the PCS 1900 system determines that the MS should be handed over to a specific IS-661 BTS and so informs the MSC such as 10 in FIG. 1. As set forth in block 106, the MSC then forwards the handover request to the IS-661 portion of the system. The identified IS-661 BTS allocates radio resources and returns an acknowledgement to the MSC as set forth in block 108. In the next step of block 110, the MSC issues a handover command for switching BTSs along with specifics such as the time and code of the communication channel. This handover command is transmitted by the PCS1900 BTS to the MS. Since the MS is monitoring transmissions of nearby BTSs, it receives the handover command, as set forth in block 112. The MS then, in block 114, switches from using the PCS1900 radio to the IS-661 radio and begins using the appropriate communication channel as set forth in the handover command. When the IS-661 BTS receives the signal from the MS, the handover process is completed as stated in block 116. The final step, in block 118, is to clear the PCS1900 resources previously allocated to the MS active call.

Figure 3:
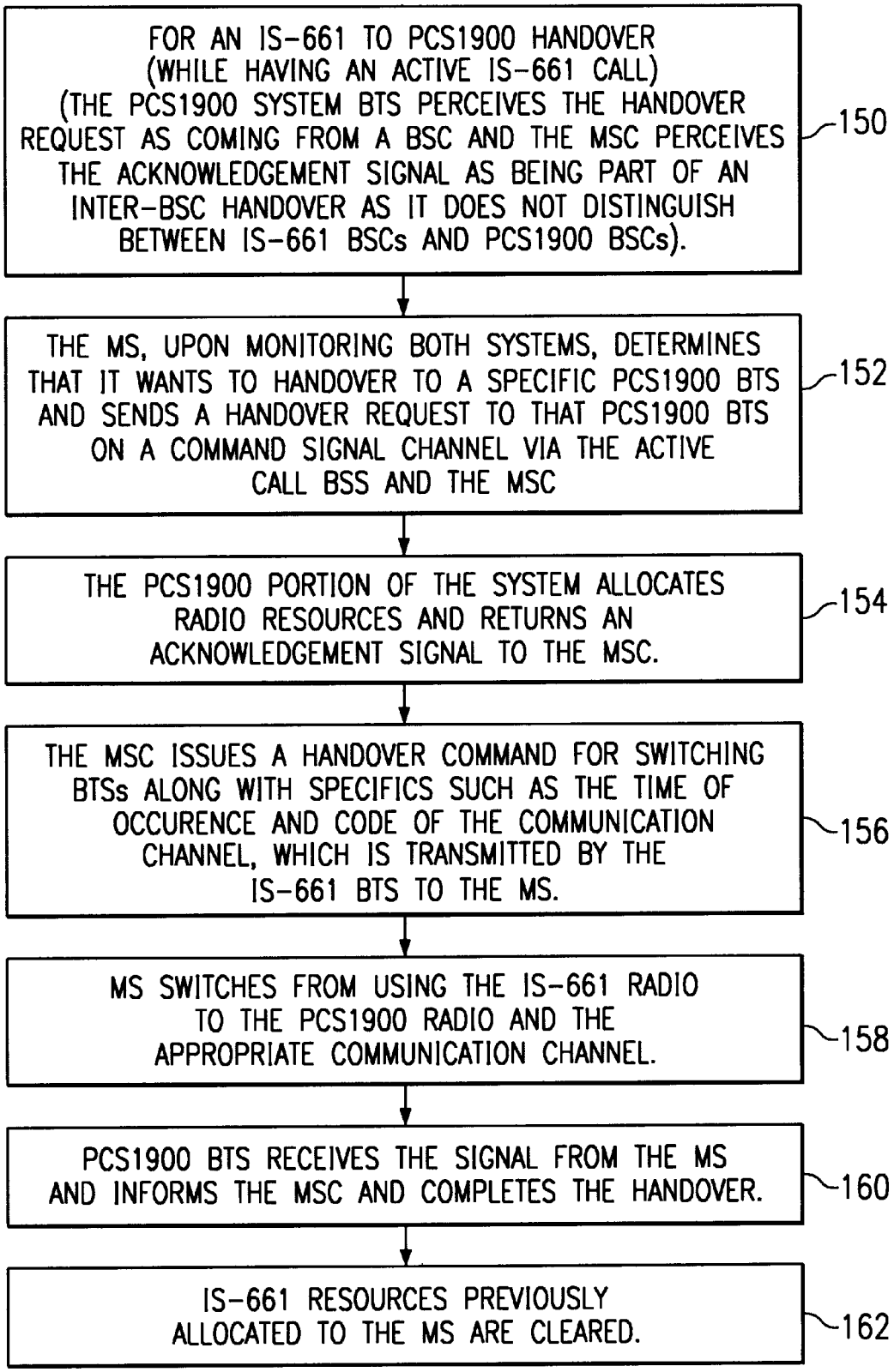
FIG. 3 is a flow diagram of system operation for an IS-661 to PCS1900 handover.

The procedure of FIG. 3 sets forth the steps involved in an IS-661 to PCS1900 handover while having an active IS-661 call. As stated in the initial block 150, the PCS1900 portion of the system perceives the handover request as coming from a BSC and the MSC perceives the acknowledgement signal as being part of an inter-BSC handover as it does not distinguish between IS-661 BSCs and PCS1900 BSCs. As recited in block 152, the MS, upon monitoring both systems, determines that it wants to handover to a specific PCS1900 BTS and sends a handover request to that PCS1900 BTS on a command signal channel via the active call BSS and the MSC. The next step, in block 154, is that the PCS1900 portion of the system allocates radio resources and returns an acknowledgement signal to the MSC. The MSC then, in block 156, issues a handover command for switching BTSs along with specifics such as the time of occurrence and code of the communication channel, which handover command is transmitted by the IS-661 BTS to the MS. Proceeding to block 158, it may be ascertained that the MS then switches from using the IS-661 radio to the PCS1900 radio and uses the appropriate communication channel as set forth in the handover command. Next the PCS1900 BTS receives the signal from the MS and informs the MSC thereby completing the handover as recited in block 160. As the final step, in block 162, the IS-661 resources previously allocated to the MS are cleared.

OPERATION

While the invention and its operation may well be obvious from the above material, a brief review will be provided. In one application of the invention, and as shown in FIG. 1, the entire territory is covered by PCS1900. Other high density areas, dead spots and fixed access units are served by a IS-661 technology system. When a user has only a single mode MS using the PCS 1900 technology, he may or may not be able to continue an active call in the problem areas depending upon many factors such as heavy traffic during certain times of day etc. The user, however, would not need to buy a new MS to communicate over most of the territory most of the time. However users with a dual mode MS that can monitor both format signals may continue an active call while traveling from one cell format to another.

The procedure used to handover an MS to a second system while the MS is having an active call with a first system is set forth for one direction in FIG. 2 and the procedure used for having an active call with a second system and transferring in the other direction is set forth in FIG. 3.

In FIG. 1, the MSC 10 along with BSCs 26 and 28 and their associated BTSs form a cellular system of typical design and may be a system operating in a first format like TDMA/FDMA as previously mentioned and as used by PCS1900 apparatus. Over a period of time, conditions change and cellular systems as originally designed are no longer adequate to accommodate the number of customers desiring service. When this happens, one prior art solution has been to add new BTS units by subdividing the cells. When a dead spot, such as 74 occurs, a potential solution is to add a low power, strategically placed antenna powered by the BTS 32. Both of these solutions involve potential interference problems for reception of signals both in the problem cell and adjacent cells. The addition of a numerically large, but localized market, like the campus 66 creates further servicing problems.

A solution to the above problems of "dead spots" and additional customers is to use a different format system such as the IS-661 TDMA/CDMA/FDMA whose signals do not interfere with the previously established system to communicate with new customers and with customers in problem areas. However, even when the new system is operated from the same MSC 10 as shown, a MS operating in the original communication signal format cannot operate within the campus 66 and will not operate reliably in the "dead spot" 74. A similar situation holds for MSs operating in the IS-661 format in that they cannot communicate with MSC 10 when they leave the areas covered by the IS-661 BTSs such as 66. The mere use of a dual mode transceiver, is not a complete solution since the IS-661 system is mobile initiated for transferring active calls while moving from one cell to another and the original PCS1900 system is network initiated in that the BSC portion of the system makes the determination as to when and how a handoff is to occur.

The bidirectional handover, which is the subject of this invention, can be accomplished by modifying the handoff procedures that the PCS1900 system uses for handoff as determined by the MSC or the BSC. No modification of the BTSs or other system components is required. The modified handoff procedure requires the PCS 1900 BSC and/or the MSC to have the capability to select an IS-661 BTS destination while having an active call on the PCS 1900 portion of the system (In other words, all IS-661 BTSs are included as handoff targets as well as the original system PCS1900 BTSs). The dual mode MS must be able to actively monitor transmissions from both format networks (PCS1900 and IS-661) and the ability to direct a command channel handover request to a PCS1900 destination BTS while having an active IS-661 format call. It is also important that the cell IDs of both systems, as stored within the MS, follow consistent formats.

Thus the PCS1900 BSCs must recognize that IS-661 format BTSs are appropriate handoff targets, all of the BTSs must be uniquely identifiable, the PCS1900 BTS must treat a handover request coming from a IS-661 MS via the BSS processing the active call and the MSC in the same manner as if a handoff request is initiated by a PCS 1900 BSC, and the MS must act as a PCS1900 transceiver when communicating in the PCS1900 format and act as a IS-661 transceiver when communicating in the IS-661 format. By communicating, we mean transmitting or receiving and monitoring.

Although we have described a system using a single MSC for convenience in describing the concept involved, the same techniques will be applicable when using this inventive concept between separate systems having different format communication signals where one system is network initiated and the other is mobile initiated whether the two systems are overlaid as shown or merely adjacent as typically has occurred in the intersystem handover attempts occurring in the past.

Although the present invention and its advantages have been described in detail, it should be understood that various changes, substitutions and alterations can be made therein without departing from the spirit and scope of the invention as defined by the appended claims.

What is claimed is:

1. A cellular communication system comprising, in combination:

a MSC (mobile services switching center);

a type A BTS (base transceiver station) in communication with said MSC and forming a cellular area within which the BTS may communicate with MSs (mobile station)s in a first signal format, said type A BTS responding to system type A initiated handoff requests relating to active calls in the type A format and responding to handover requests initiated by and generated from an MS relating to active calls in the type B format; and a type B BTS in communication with said MSC and forming a cellular area, distinct from and within a portion of the cellular area formed by said type A BTS, within which the type B BTS may communicate with MSs (mobile station)s in a second signal format.

2. A cellular communication system comprising, in combination:

a MSC (mobile services switching center);

a type A BTS (base transceiver station) in communication with said MSC and forming a cellular area within which the BTS may communicate with MSs (mobile station)s in a first signal format; and a type B BTS in communication with said MSC and forming a cellular area, distinct from and within a portion of the cellular area formed by said type A BTS, within which the BTS may communicate with MSs (mobile station)s in a second signal format, said type B BTS responding to system initiated type A handover requests relating to active calls in the type A format and responding to MS initiated handoff requests relating to active calls in the type B format.

3. A method of transferring a MS (mobile station) active call from BTS-A (a base station transceiver operating in a first communication signal format) to BTS-B (a base station transceiver operating in a second communication signal format) where BTS-A comprises part of a cellular communication system that allows mobile initiated handoffs and BTS-B comprises part of a cellular communication system where a BSC (base station controller) initiates handoffs and where the two systems communicate through a common MSC (mobile services switching center) comprising, the steps of:

receiving a request for handover initiated by a MS having an active call with a BTS-A specifying BTS-B as a target;

transmitting the request for handover from BTS-A through MSC to BTS-B;

allocating radio resources at BTS-B;

returning an acknowledgement signal from BTS-B through said BSC and said MSC to BTS-A;

transmitting a handover command from said MSC to BTS-A for forwarding to the MS making the handover request;

receiving a signal, from the MS making the handoff request, over the allocated resources of BTS-B;

transmitting a communication from BTS-B to said MSC that the handover has been completed; and clearing the radio resources at BTS-A that were being used for the active call.

4. Apparatus for transferring a MS (mobile station) active call from BTS-A (a base station transceiver operating in a first communication signal format) to BTS-B (a base station transceiver operating in a second communication signal format) where BTS-A comprises part of a cellular communication system that allows mobile initiated handoffs and BTS-B comprises part of a cellular communication system where a BSC (base station controller) initiates handoffs and where the two systems communicate through a common MSC (mobile services switching center) comprising, in combination:

means for receiving a request for handover from a MS at a BTS-A specifying a BTS-B as a target;

means for transmitting the request for handover from BTS-A through a MSC to BTS-B;

means for allocating radio resources at said BTS-B;

means for returning an acknowledgement signal from said BTS-B through said BSC and said MSC to said BTS-A;

means for transmitting a handover command from said MSC to said BTS-A for forwarding to the MS making the handover request;

means for receiving a signal from the MS making the handoff request over the allocated resources of said BTS-B;

means for transmitting a communication from said BTS-B to said MSC that the handover has been completed; and means for clearing the radio resources at said BTS-A that were being used for the active call.

5. A method of transferring a MS (mobile station) active call from BTS-B (a base station transceiver operating in a first communication signal format) to BTS-A (a base station transceiver operating in a second communication signal format) where BTS-A comprises part of a cellular communication system that allows mobile initiated handoffs and BTS-B comprises part of a cellular communication system where a BSC (base station controller) initiates handoffs and where the two systems communicate through a common MSC (mobile services switching center) comprising, the steps of:

determining that a handover should be made from BTS-B to BTS-A through information collected by said BSC;

informing the MSC that BTS-A should receive a handover;

transmitting the request for handover from MSC to BTS-A;

allocating radio resources at BTS-A;

returning an acknowledgement signal from BTS-A to said MSC;

transmitting a handover command from said MSC to BTS-B for forwarding to the MS having the active call in question with BTS-B;

receiving a signal from the MS over the allocated resources of BTS-A; and clearing the radio resources at BTS-B that were being used for the active call.

6. Apparatus for transferring a MS (mobile station) active call from BTS-B (a base station transceiver operating in a first communication signal format) to BTS-A (a base station transceiver operating in a second communication signal format) where BTS-A comprises part of a cellular communication system that allows mobile initiated handoffs and BTS-B comprises part of a cellular communication system where a BSC (base station controller) initiates handoffs and where the two systems communicate through a common MSC (mobile services switching center) comprising, in combination:

means for determining that a handover should be made from a BTS-B to a BTS-A through information collected by a BSC;

means for informing a MSC that said BTS-A should receive a handover request;

means for transmitting the request for handover from said MSC to said BTS-A;

means for allocating radio resources at said BTS-A;

means for returning an acknowledgement signal from said BTS-A to said MSC;

means for transmitting a handover command from said MSC to said BTS-B for forwarding to the MS having the active call in question with said BTS-B;

means for receiving a signal from the MS over the allocated resources of said BTS-A; and means for clearing the radio resources at said BTS-B that were being used for the active call.

7. A cellular communication system having top level, intermediate level and bottom level administrative functions in appropriate top level, intermediate level and bottom level means, each of any bottom level means forming a distinct defined cell for communicating with MSs (mobile stations) within its distinct defined cell comprising, in combination:

a first plurality of bottom level means communicating with MSs within their cells in a first signal format, said bottom level means, of said first plurality, expecting to receive handoff requests via and initiated by a higher level portion of the system;

a second plurality of bottom level means communicating with MSs within their cells in a second signal format, said bottom level means, of said second plurality, expecting to receive handoff requests from and initiated by a MS; and a dual mode MS, ready to transfer to a bottom level means of said first plurality and having an active call linked through a bottom level means of said second plurality, having means for sending a handover request, on a command channel, to a particular bottom level means of said first plurality.

8. Dual format cellular communication system comprising, in combination:

a MSC (Mobile services Switching Center);

first format apparatus connected to and controlled by said MSC, including at least one BSS-A (type A base station subsystem), said at least one BSS-A making handoff determinations directly relating to active calls in said first format and receiving handover requests indirectly from at least one MS having an active call in a format different from said first format wherein the handover request specifies a particular BTS; and second format apparatus connected to and controlled by said MSC, including at least one BSS-B (type B base station subsystem), said at least one BSS-B receiving handoff requests directly from at least one MS having an active call in said second format and receiving handover requests from said MSC relating to a MS having an active call in a format different from said second format wherein the handover request specifies a particular BTS.

9. The method of accommodating handoffs and intersystem handovers when a system A is network initiated and a system B is mobile initiate and both systems A and B are controlled by a single MSC comprising the steps of:

receiving handover requests at a BSS-B (system B base station subsystem) relating to system A active calls indirectly from a BSS-A (system A base station subsystem) via a MSC (Mobile services Switching Center); and receiving handoff requests at said BSS-B relating to system B active calls directly from a MS (mobile station) engaged in the active call.

10. The method of accommodating handoffs and inter-system handovers when a system A is network initiated and a system B is mobile initiated and both systems A and B are controlled by a single MSC comprising the steps of:

internally initiating handoffs at a BSS-A (system A base station subsystem) relating to system A active calls; and receiving handover requests at said BSS-A relating to system B active calls indirectly from a MS (mobile station) via a BSS-B (system B base station subsystem) in system B and the MSC.

11. The method of handing-off and handing-over active calls between network initiated and mobile initiated systems both systems being controlled in part by a single MSC comprising the steps of:

receiving BSC generated handoff requests for network initiated system active calls at a network initiated system BTS;

receiving MS generated handover requests for mobile initiated system active calls at a network initiated system BTS;

receiving MS generated handoff requests for mobile initiated system active calls at a mobile initiated system BTS; and receiving BSC generated handover requests for network initiated system active calls at a mobile initiated system BTS.

12. A cellular communication system comprising, in combination:

a network initiated cellular system including BTSs (base station transceiver subsystem)s and associated BSCs (base station controller)s;

a mobile initiated cellular system including BTSs and associated BSCs; and a MSC (mobile services switching center) connected to both said network initiated and said mobile initiated cellular systems, the BTSs of said mobile initiated system receiving handoff requests from MSs (mobile station)s relative mobile initiated cellular system active calls and receiving intersystem handover requests relative network initiated cellular system active calls.

13. A dual mode cellular communication system wherein both cellular modes are controlled by a common MSC comprising, in combination:

a network initiated cellular system including BTSs (base station transceiver subsystem)s and associated BSCs (base station controller)s, said BTSs receiving handoff requests initiated by a BSC and handover requests initiated by a MS (mobile station); and a mobile initiated cellular system including BTSs (base station transceiver subsystem)s, said BTSs receiving handoff requests directly from a MS and handover requests from initiated by a BSC.

14. Cellular phone apparatus for communicating with communication systems operating in first and second signal formats and being controlled by a common MSC comprising, in combination:

first means for monitoring radio signals of a first format and storing information as to received signal quality and cell IDs of base station transceivers supplying the received signals;

second means for monitoring radio signals of a second format and storing information as to received signal quality and cell IDs of base station transceivers supplying the received signals;

third means for determining that, while communicating with another phone in the first signal format, the cellular phone apparatus needs to be handed over to a transmitter broadcasting in the second signal format;

fourth means for sending a handover request in said first signal format for forwarding to a specific base station transceiver operating in said second signal format;

fifth means for receiving a switch command in said first signal format authorizing said phone to use said second signal format for communicating with said another phone; and sixth means for switching communications with said another phone to said second signal format in accordance with the instructions of said switch command.

15. The method of maintaining an active call presently interacting with a transceiver in a cell using a first signal format while switching to a transceiver cell operating in a second signal format where one of said first and second signal formats is associated with a network-initiated handoff and the other is associated with a transceiver-associated handoff and wherein both cells are controlled by a single MSC (Mobile services Switching Center) comprising the steps of:

continuously monitoring the strength of received radio signals of both first and second formats;

determining that a handover request to a base station, from which signals of said second signal format are being received, is appropriate;

transmitting a handover request in said first signal format in response to the determination of said last named means; and switching the active call to said second signal format in response to a switch command signal received in said first signal format.

16. The method of maintaining a first communication signal format active call from a MS (mobile station) while the MS is moving between communication systems and wherein one system is network initiated and the other is mobile initiated and further wherein one system uses a first communication signal format and the other uses a second communication signal format and even further wherein a single MSC (master switching center) controls both systems comprising, the steps of:

continuously monitoring any received radio signals from BTSs (base station transceiver)s of both the network initiated and the mobile initiated systems through the use of separate radio subsystems in the MS while maintaining an active call in said first signal format;

transmitting a handover request in said first signal format in response to a determination within said MS that said active call could be more reliably maintained with a BTS using said second communication signal format; and switching the active call to said second signal format in response to a switch command signal received from the system BTS supplying the active call in said first communication signal format.

\* \* \* \* \*